(12) United States Patent
Choi et al.

(10) Patent No.: US 12,522,693 B2
(45) Date of Patent: Jan. 13, 2026

(54) COPOLYMER AND PREPARATION METHOD THEREOF

(71) Applicant: LG CHEM, LTD., Seoul (KR)

(72) Inventors: Jung Yun Choi, Daejeon (KR); Chul Woong Kim, Daejeon (KR); Yeonju Lee, Daejeon (KR); Suhyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 576 days.

(21) Appl. No.: 17/918,371

(22) PCT Filed: Oct. 5, 2021

(86) PCT No.: PCT/KR2021/013586
§ 371 (c)(1),
(2) Date: Oct. 12, 2022

(87) PCT Pub. No.: WO2022/075684
PCT Pub. Date: Apr. 14, 2022

(65) Prior Publication Data
US 2023/0146000 A1 May 11, 2023

(30) Foreign Application Priority Data

Oct. 5, 2020 (KR) .......................... 10-2020-0128319
Oct. 5, 2021 (KR) .......................... 10-2021-0131495

(51) Int. Cl.
| C08G 63/06 | (2006.01) |
| C08G 63/08 | (2006.01) |
| C08G 63/82 | (2006.01) |
| C08G 63/85 | (2006.01) |

(52) U.S. Cl.
CPC ............ *C08G 63/06* (2013.01); *C08G 63/08* (2013.01); *C08G 63/823* (2013.01); *C08G 63/85* (2013.01)

(58) Field of Classification Search
CPC ........ C08G 63/06; C08G 63/08; C08G 63/78; C08G 63/823; C08G 63/912
See application file for complete search history.

(56) References Cited

U.S. PATENT DOCUMENTS

| 2011/0046339 A1* | 2/2011 | Park .................. C12P 7/625 |
| | | 435/135 |
| 2013/0184429 A1 | 7/2013 | Pugh et al. |
| 2014/0037931 A1 | 2/2014 | Yoo et al. |
| 2014/0163178 A1 | 6/2014 | Sohn et al. |
| 2017/0106125 A1 | 4/2017 | Wang et al. |
| 2018/0001716 A1 | 1/2018 | Grunlan et al. |
| 2019/0010277 A1 | 1/2019 | Williams et al. |
| 2019/0050866 A1 | 2/2019 | Wang et al. |
| 2019/0113112 A1 | 4/2019 | Schug et al. |
| 2020/0031968 A1 | 1/2020 | Zinn et al. |
| 2020/0172680 A1 | 6/2020 | Choi et al. |
| 2020/0270649 A1* | 8/2020 | Kang .................. C08G 63/06 |
| 2021/0340314 A1 | 11/2021 | Choi et al. |
| 2022/0251612 A1 | 8/2022 | Kang et al. |
| 2022/0282030 A1* | 9/2022 | Choi .................. C08J 3/203 |

FOREIGN PATENT DOCUMENTS

| CN | 1908030 | 2/2007 |
| CN | 100372881 | 3/2008 |
| CN | 111194353 | 5/2020 |
| JP | H09-224488 A | 9/1997 |

(Continued)

OTHER PUBLICATIONS

Ren et al., "Microbial synthesis of a novel terpolyester P(LA-co-3HB-co-3HP) from low-cost substrates," Microbial Biotech. 10(2), 371-380 (Year: 2017).*

(Continued)

*Primary Examiner* — Kregg T Brooks
(74) *Attorney, Agent, or Firm* — Bryan Cave Leighton Paisner LLP

(57) ABSTRACT

Provided is a copolymer comprising an irregularly arranged structure of a repeating unit of the following Chemical Formula 1 and a repeating unit of the following Chemical Formula 2, and a repeating unit of the following Chemical Formula 3 present at least at one end of the structure:

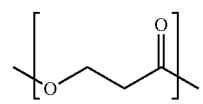

[Chemical Formula 1]

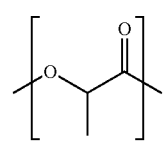

[Chemical Formula 2]

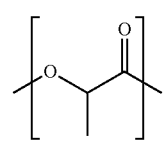

[Chemical Formula 3]

and is characterized by having an improved elongation and also having a high weight average molecular weight while maintaining intrinsic properties of a polylactic acid. Also provided are methods of preparing the copolymer.

8 Claims, No Drawings

(56) References Cited

FOREIGN PATENT DOCUMENTS

| JP | 3349755 | 11/2002 | | |
|---|---|---|---|---|
| JP | 2004-149692 A | 5/2004 | | |
| JP | 2007-321141 | 12/2007 | | |
| JP | 2011-153275 A | 8/2011 | | |
| JP | 2014-507524 | 3/2014 | | |
| JP | 2014-519539 A | 8/2014 | | |
| JP | 2018-523740 | 8/2018 | | |
| JP | 2020-518696 | 6/2020 | | |
| JP | 2021-528535 A | 10/2021 | | |
| KR | 10-2005-0024295 | 3/2005 | | |
| WO | WO-2019177371 A1 * | 9/2019 | ............. | C08G 63/06 |
| WO | WO-2021054721 A1 * | 3/2021 | ............... | B29B 7/00 |

OTHER PUBLICATIONS

Watts, A., "High performing sustainable thermoplastic elastomers," In partial fulfillment of the requirements for the degree of doctor of philosophy, University of Minnesota, pp. 1-277 (2019).

Amador et al., "Entropically Driven Macrolide Polymerizations for the Sythesis of Aliphatic Polyester Copolymers Using Titanium Isopropoxide," Macromolecules, 52:2371-2383 (2019).

Dong et al., "Synthesis of Star-Shaped Poly(D,L-Lactic Acid-alt-Glycolic Acid)-b-Poly(L-Lactic acid) with the Poly(D,L-Lactic Acid-alt-Glycolic Acid) Macroinitiator and Stannous Octoate Catalyst," Journal of Polymer Science: Part A: Polymer Chemistry, 40:409-415 (2002).

* cited by examiner

COPOLYMER AND PREPARATION METHOD THEREOF

CROSS-REFERENCE TO RELATED APPLICATIONS

This application is a National Stage Application of International Application No. PCT/KR2021/013586 filed on Oct. 5, 2021, which claims priority to and the benefits of Korean Patent Application No. 10-2020-0128319, filed on Oct. 5, 2020, and Korean Patent Application No. 10-2021-0131495, filed on Oct. 5, 2021, the disclosures of which are hereby incorporated by reference herein in their entirety.

TECHNICAL FIELD

The present invention relates to a copolymer having an improved elongation and a high molecular weight at the same time while maintaining intrinsic properties of polylactic acid, and a preparation method thereof.

BACKGROUND

Polylactic acid (PLA) is a plant-derived resin obtained from plants such as corn, etc., and is receiving attention as an eco-friendly material having biodegradable properties while having excellent tensile strength and elastic modulus.

Unlike petroleum-based resins such as polystyrene resins, polyvinyl chloride resins, polyethylene resins, etc., which are currently used, polylactic acid has effects of preventing depletion of petroleum-based resources and suppressing carbon dioxide emissions, and therefore, causes less environmental pollution, which is a disadvantage of petroleum-based plastic products. As environmental pollution caused by waste plastics and the like has emerged as social problems, efforts have been made to expand the application of polylactic acid to various fields, including food packing materials and containers, cases for electronic products, etc., to which general plastics (petroleum-based resins) have been applied.

However, since polylactic acid has poor impact resistance and heat resistance, as compared to the existing petroleum-based resins, there is a limitation in its application. In addition, polylactic acid has a poor elongation to break to exhibit brittleness, which limits its use as a general-purpose resin.

To overcome the above disadvantages, studies have been conducted on copolymers including other repeating units in addition to polylactic acid. In particular, to improve the elongation, 3-hydroxypropionic acid (3HP) has attracted attention as a comonomer. Specifically, a lactic acid-3HP block copolymer has received attention, and this copolymer has effects of improving the elongation while maintaining intrinsic properties of polylactic acid.

However, the lactic acid-3HP block copolymer has several disadvantages. First, only 3HP needs to be separately polymerized. There is a problem in that it is difficult to polymerize 3HP having a high molecular weight of about 10 kDa or more only by a chemical method. High molecular weight polymerization is possible through biosynthesis, but there is a problem in that the production cost is increased.

Accordingly, it is required to prepare a copolymer having an improved elongation and a high molecular weight at the same time while maintaining intrinsic properties of polylactic acid.

BRIEF DESCRIPTION

Technical Problem

Provided is a copolymer having an improved elongation and a high molecular weight at the same time while maintaining intrinsic properties of polylactic acid, and a preparation method thereof.

Technical Solution

To achieve the above objects, provided is a copolymer comprising an irregularly arranged structure of a repeating unit of the following Chemical Formula 1 and a repeating unit of the following Chemical Formula 2, and a repeating unit of the following Chemical Formula 3 present at least at one end of the structure:

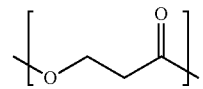

[Chemical Formula 1]

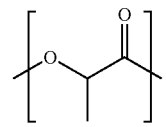

[Chemical Formula 2]

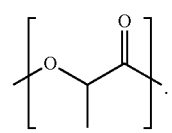

[Chemical Formula 3]

To provide a copolymer having an improved elongation and a high molecular weight at the same time while maintaining intrinsic properties of polylactic acid, the present invention provides a copolymer including a repeating unit of Chemical Formula 1, derived from 3HP, a repeating unit of Chemical Formula 2, derived from lactic acid, and a repeating unit of Chemical Formula 3, derived from lactide.

In particular, the copolymer according to the present invention can have a structure, in which the repeating unit of Chemical Formula 1 and the repeating unit of Chemical Formula 2 are irregularly arranged, and the repeating unit of Chemical Formula 3 is present at least at one end or at both ends of the structure. In other words, the copolymer according to the present invention can have a structure of A-B or B-A-B, wherein A has a random arrangement of the repeating unit of Chemical Formula 1 and the repeating unit of Chemical Formula 2, and the B's have an arrangement of the repeating unit of Chemical Formula 3, respectively.

Hereinafter, each repeating unit will be described in detail.

Repeating Unit of Chemical Formula 1 and Repeating Unit of Chemical Formula 2

The repeating unit of Chemical Formula 1 and the repeating unit of Chemical Formula 2 can form a central structure of the copolymer according to the present invention, and can be derived from 3HP and lactic acid, respectively, and the central structure can be prepared by copolymerizing 3HP and lactic acid, as described below.

When 3HP is used as a comonomer of polylactic acid, elongation can be improved while maintaining intrinsic physical properties of polylactic acid, but there is a problem in that polymerization of 3HP does not occur well. Therefore, there has been a limitation in the preparation of a copolymer having a high molecular weight by using a lactic acid-3HP block copolymer. However, in the present invention, a copolymer having a high molecular weight can be prepared by polymerization of 3HP with lactic acid, rather than separate polymerization of only 3HP.

Preferably, a weight ratio of the repeating unit of Chemical Formula 1 and the repeating unit of Chemical Formula 2 is 20:80 to 80:20. More preferably, the weight ratio is 30:70 to 70:30, 40:60 to 60:40. The weight ratio can be adjusted according to the amount of each material used during the copolymerization of lactic acid and 3HP.

Further, since the copolymer according to the present invention is prepared by preparing a copolymer including the repeating unit of Chemical Formula 1 and the repeating unit of Chemical Formula 2, i.e., a random copolymer of the repeating unit of Chemical Formula 1 and the repeating unit of Chemical Formula 2, and then preparing a copolymer including the repeating unit of Chemical Formula 3, as described below, it is possible to measure the weight average molecular weight of the random copolymer.

Preferably, a weight average molecular weight of the random copolymer of the repeating unit of Chemical Formula 1 and the repeating unit of Chemical Formula 2 is 10,000 g/mol to 30,000 g/mol. This weight average molecular weight is higher than that of the known lactic acid-3HP block copolymer, and therefore, in the present invention, it is possible to prepare a copolymer having a high molecular weight even using 3HP as the comonomer of polylactic acid.

Meanwhile, as used herein, the 'lactic acid' refers to L-lactic acid, D-lactic acid, or a mixture thereof.

Repeating Unit of Chemical Formula 3

As described above, the copolymer according to the present invention has a structure of A-B or B-A-B, wherein B has a structure having an arrangement of the repeating unit of Chemical Formula 3.

Specifically, the arrangement of the repeating unit of Chemical Formula 3 can be further included at least at one end or at both ends of the above-described random copolymer of the repeating unit of Chemical Formula 1 and the repeating unit of Chemical Formula 2 through lactide ring-opening polymerization, as described below.

The repeating unit of Chemical Formula 3 is derived from lactide, and is to additionally introduce a repeating unit such as Chemical Formula 2 to the copolymer according to the present invention, whereby the weight average molecular weight of the copolymer according to the present invention can be increased, and intrinsic physical properties of polylactic acid can be manifested.

Preferably, the repeating unit of Chemical Formula 3 is included in an amount of 60 wt % to 99 wt % with respect to the total weight of the copolymer according to the present invention. In other words, the total weight of the repeating unit of Chemical Formula 1 and the repeating unit of Chemical Formula 2 is preferably 1 wt % to 40 wt % with respect to the total weight of the copolymer according to the present invention. More preferably, the total weight of the repeating unit of Chemical Formula 1 and the repeating unit of Chemical Formula 2 is 2 wt % or more, 3 wt % or more, 4 wt % or more, or 5 wt % or more, and 35 wt % or less, 30 wt % or less, 25 wt % or less, 20 wt % or less, or 15 wt % or less with respect to the total weight of the copolymer according to the present invention.

The content of the repeating unit of Chemical Formula 3 can be adjusted according to the amount of lactide used during the copolymerization of lactide.

Meanwhile, as used herein, the 'lactide' refers to L-lactide, D-lactide, meso-lactide consisting of each one of L-form and D-form, or D,L-lactide or rac-lactide, in which L-lactide and D-lactide are mixed at a weight ratio of 50:50.

Copolymer

The above-described copolymer according to the present invention employs, as an initiator, the random copolymer of the repeating unit of Chemical Formula 1 and the repeating unit of Chemical Formula 2, and thus there is an advantage in that various physical properties can be achieved by adjusting the monomer ratio in the random copolymer as the initiator. Further, by controlling crystallinity of the initiator itself, the intrinsic properties of polylactic acid are maintained while particularly improving the elongation and increasing the weight average molecular weight.

Preferably, a weight average molecular weight (g/mol) of the copolymer is 50,000 to 300,000. As described above, 3HP and lactic acid are first copolymerized, and then lactide is subjected to ring-opening polymerization, thereby preparing the copolymer having the high weight average molecular weight. Preferably, the weight average molecular weight of the copolymer is 60,000 or more, 70,000 or more, 80,000 or more, 90,000 or more, or 100,000 or more. Meanwhile, a method of measuring the weight average molecular weight will be described below.

Further, the copolymer according to the present invention has a tensile strength of 20 MPa to 50 MPa. Further, the copolymer according to the present invention has an elongation of 4% to 200%. As compared to a polylactic acid having the same weight average molecular weight, the copolymer according to the present invention has a tensile strength at the similar level, but has an improved elongation, which is attributed to 3HP included in the copolymer, as described above. Meanwhile, methods of measuring the tensile strength and the elongation will be described below.

Method of Preparing Copolymer

Further, the present invention provides a method of preparing the above-described copolymer, wherein the method comprises the following steps of:

1) preparing an oligomer by polycondensation of 3-hydroxypropionic acid and lactic acid; and 2) polymerizing the oligomer of the step 1 and a lactide.

The step 1 is a step of preparing the above-described random copolymer of the repeating unit of Chemical Formula 1 and the repeating unit of Chemical Formula 2.

Preferably, the step 1 is performed in the presence of an acid catalyst or a metal catalyst. Examples of the acid catalyst can include an organic acid, preferably, p-toluenesulfonic acid. Examples of the metal catalyst can include a phosphorus-based catalyst or a tin-based catalyst.

Preferably, the amount of the catalyst used in the step 1 can be 0.01 mol % to 10 mol %, 0.1 mol % to 5 mol %, or 0.2 mol % to 1 mol %, assuming that the total number of moles of 3-hydroxypropionic acid and lactic acid is 100 mol %.

Preferably, the step 1 is performed at 100° C. to 150° C. Preferably, the step 1 is performed for 10 hours to 80 hours, and more preferably, for 20 hours to 60 hours. Preferably, the step 2 is performed at 0.01 mbar to 50 mbar.

Preferably, the step 2 is performed in the presence of a lactide ring-opening polymerization catalyst. For example, the catalyst can be a catalyst of Chemical Formula 4:

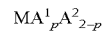 [Chemical Formula 4]

wherein in Chemical Formula 4:

M is Al, Mg, Zn, Ca, Sn, Fe, Y, Sm, Lu, Ti, or Zr;

p is an integer of 0 to 2; and $A^1$ and $A^2$ are each independently an alkoxy group or a carboxyl group.

More specifically, the catalyst of Chemical Formula 4 can be tin(II) 2-ethylhexanoate ($Sn(Oct)_2$).

Preferably, the amount of the catalyst used in the step 2 can be 0.01 mol % to 10 mol %, 0.01 mol % to 5 mol %, or 0.03 mol % to 1 mol %, assuming that the total number of moles of oligomer of the step 1 and lactide is 100 mol %.

Preferably, the step 2 is performed at 150° C. to 200° C. Preferably, the step 2 is performed for 5 minutes to 10 hours, and more preferably, for 10 minutes to 1 hour. Preferably, the step 2 is performed at 0.5 mbar to 1.5 mbar.

On the other hand, the step 2 can be performed by bulk polymerization substantially without using a solvent. In this regard, 'substantially without using a solvent' can include a case of using a small amount of a solvent for dissolving the catalyst, for example, up to less than 1 ml of the solvent per 1 kg of the monomer used. When the step 2 is performed by bulk polymerization, it is possible to omit a process of removing the solvent after the polymerization, and thus it is possible to suppress the decomposition or loss of the resin during the process of removing the solvent.

Effect of the Invention

As descried above, the copolymer according to the present invention is characterized by maintaining intrinsic properties of polylactic acid while particularly having an improved elongation and also having a high weight average molecular weight.

DETAILED DESCRIPTION

Hereinafter, exemplary embodiments of the present invention will be described in more detail in the following Examples. However, the following Examples are only for illustrating the exemplary embodiments of the present invention, and the content of the present invention is not limited to the following Examples.

Hereinafter, a weight average molecular weight, a tensile strength, and an elongation were measured by the following methods.

Weight average molecular weight: Measurement was performed by GPC using PC Standards and Agilent 1200 series HPLC system.

Elongation, Tensile strength, and Tensile modulus: Measurement was performed in accordance with ASTM D638. Each copolymer was prepared in the form of pellet, and then processed into a dog-bone specimen, followed by measuring using a universal testing machine (UTM). At this time, the measurement speed was 10 mm/min.

Content of 3HP (wt %) in copolymer: Measurement was performed by NMR analysis of each copolymer.

Preparation Examples 1 to 4

In a reactor, 3-Hydroxypropionic acid (3HP), lactic acid (LA), and a catalyst (p-TSA; 0.3 wt % with respect to the total weight of 3HP and LA) were mixed in the amounts as described in Table 1 below, and dried under conditions of 70° C. and 50 mbar for 3 hours. Subsequently, the temperature and the pressure in the reactor were controlled to 130° C. and 20 mbar, and then a polycondensation reaction was allowed to proceed for 24 hours.

With respect to each of the prepared random copolymers, the content of 3HP in each copolymer and its weight average molecular weight were measured and shown in Table 1 below.

TABLE 1

| | 3HP input (g) | LA input (g) | 3HP input ratio (wt %) | 3HP content (wt %) in copolymer | Weight average molecular weight (Mw, g/mol) of random copolymer |
|---|---|---|---|---|---|
| Preparation Example 1 | 7 | 3 | 70 | 68 | 16,700 |
| Preparation Example 2 | 5 | 5 | 50 | 44 | 15,850 |
| Preparation Example 3 | 3 | 7 | 30 | 31 | 27,600 |
| Preparation Example 4 | 10 | 0 | 100 | 100 | 2,430 |

Examples and Comparative Examples

As in Table 2 below, each of the random copolymers prepared in Preparation Examples, lactide, and a catalyst (Tin Octoate, 0.05 mol % with respect to lactide) were put in a reactor, which was controlled to 170° C. and 20 mbar, and a lactide ring-opening polymerization was allowed to proceed for 30 minutes.

Meanwhile, in Table 2 below, Comparative Example 1 indicates a copolymer prepared by ring-opening polymerization using lactide alone without using the random copolymer prepared in Preparation Example.

TABLE 2

| | Random copolymer | Lactide |
|---|---|---|
| Example 1-1 | Random copolymer of Preparation Example 1 (10 wt %) | lactide (90 wt %) |
| Example 1-2 | Random copolymer of Preparation Example 1 (30 wt %) | lactide (70 wt %) |
| Example 1-3 | Random copolymer of Preparation Example 1 (5 wt %) | lactide (95 wt %) |
| Example 2-1 | Random copolymer of Preparation Example 2 (10 wt %) | lactide (90 wt %) |
| Example 3-1 | Random copolymer of Preparation Example 3 (10 wt %) | lactide (90 wt %) |
| Example 3-2 | Random copolymer of Preparation Example 3 (20 wt %) | lactide (80 wt %) |
| Example 4-1 | Random copolymer of Preparation Example 3 (30 wt %) | lactide (70 wt %) |
| Comparative Example 1 | None | lactide (100 wt %) |
| Comparative Example 2 | Random copolymer of Preparation Example 4 (10 wt %) | lactide (90 wt %) |

Experimental Example

A weight average molecular weight, a tensile strength, and an elongation were measured for the copolymers prepared in Examples and Comparative Examples, and the results are shown in Table 3 below.

TABLE 3

| | 3HP content (wt %) in copolymer | Weight average molecular weight (Mw, g/mol) | Tensile strength (MPa) | Elongation (%) |
|---|---|---|---|---|
| Example 1-1 | 7.2 | 164,650 | 36.80 | 14.90 |
| Example 1-2 | 21.0 | 80,900 | 27.7 | 107 |

TABLE 3-continued

| | 3HP content (wt %) in copolymer | Weight average molecular weight (Mw, g/mol) | Tensile strength (MPa) | Elongation (%) |
|---|---|---|---|---|
| Example 1-3 | 3.8 | 214,500 | 44.5 | 3.4 |
| Example 2-1 | 5.0 | 190,370 | 32.40 | 5.0 |
| Example 3-1 | 2.5 | 255,000 | 41.45 | 4.3 |
| Example 3-2 | 7.6 | 179,200 | 32.8 | 66.2 |
| Example 4-1 | 9.8 | 108,360 | 28.73 | 152.5 |
| Comparative Example 1 | 0 | 239,000 | 50.13 | 2.2 |
| Comparative Example 2 | 10 | 31,700 | Evaluation of physical properties was impossible due to low molecular weight | |

As shown in Table 2, it was confirmed that the copolymer according to the present invention had the increased elongation, as compared with the copolymer prepared by polymerizing lactide alone (Comparative Example 1). When Example 4 was compared with Comparative Example 2, in which lactic acid was not used in the polymerization, the effect of increasing the molecular weight was observed when lactic acid was copolymerized, indicating improvement of physical properties.

The invention claimed is:

1. A copolymer, comprising a structure of A-B or B-A-B, where:
   A has a random arrangement of a repeating unit of the following Chemical Formula 1 and a repeating unit of the following Chemical Formula 2, and
   B has an arrangement of a repeating unit of the following Chemical Formula 3, wherein B is present at least at one end of the copolymer,
   wherein a total weight of A having the repeating unit of Chemical Formula 1 and the repeating unit of Chemical Formula 2 is 1 wt % to 40 wt % with respect to the total weight of the copolymer A-B or B-A-B:

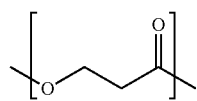
[Chemical Formula 1]

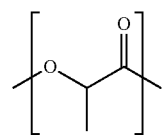
[Chemical Formula 2]

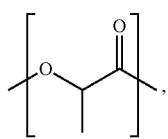
[Chemical Formula 3]

wherein the copolymer A-B or B-A-B has a tensile strength of 20 MPa to 50 MPa.

2. The copolymer of claim 1, wherein a weight ratio of the repeating unit of Chemical Formula 1 and the repeating unit of Chemical Formula 2 is 20:80 to 80:20.

3. The copolymer of claim 1, wherein a total weight of A having the repeating unit of Chemical Formula 1 and the repeating unit of Chemical Formula 2 is 5 wt % to 15 wt % with respect to the total weight of the copolymer A-B or B-A-B.

4. The copolymer of claim 1, wherein the copolymer A-B or B-A-B has a weight average molecular weight of 50,000 g/mol to 300,000 g/mol.

5. The copolymer of claim 1, wherein the copolymer A-B or B-A-B has an elongation of 4% to 200%.

6. A method of preparing a copolymer comprising an irregularly arranged structure of a repeating unit of the following Chemical Formula 1 and a repeating unit of the following Chemical Formula 2, and
a repeating unit of the following Chemical Formula 3 present at least at one end of the structure,

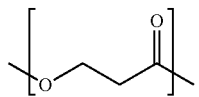
[Chemical Formula 1]

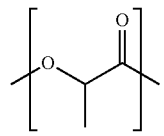
[Chemical Formula 2]

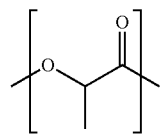
[Chemical Formula 3]

wherein the method comprises the following steps of:
1) Preparing an oligomer by polycondensation of 3-hydroxypropionic acid and lactic acid; and
2) polymerizing the oligomer of the step 1 and a lactide.

7. The method of claim 6, wherein a catalyst of the step 2 is a catalyst of the following Chemical Formula 4:

$$MA^1{}_pA^2{}_{2-p}$$ [Chemical Formula 4]

wherein in Chemical Formula 4:
M is Al, Mg, Zn, Ca, Sn, Fe, Y, Sm, Lu, Ti, or Zr;
p is an integer of 0 to 2; and
$A^1$ and $A^2$ are each independently an alkoxy group or a carboxyl group.

8. The method of claim 6, wherein a catalyst of the step 2 is tin(II) 2-ethylhexanoate.

* * * * *